(12) United States Patent  
Hoadley et al.

(10) Patent No.: US 8,299,732 B2
(45) Date of Patent: Oct. 30, 2012

(54) POWER CONVERSION SYSTEM AND METHOD

(75) Inventors: Frederick L. Hoadley, Mequon, WI (US); Gary L. Skibinski, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 741 days.

(21) Appl. No.: 12/354,040

(22) Filed: Jan. 15, 2009

(65) Prior Publication Data

US 2010/0176755 A1 Jul. 15, 2010

(51) Int. Cl.
*H02P 1/00* (2006.01)

(52) U.S. Cl. .............. 318/105; 318/400.28; 318/400.27; 318/400.26; 318/400.17; 318/34

(58) Field of Classification Search .................. 318/105, 318/34, 400.17, 400.2, 400.26, 400.27, 400.28
See application file for complete search history.

(56) References Cited

U.S. PATENT DOCUMENTS

| | | | |
|---|---|---|---|
| 4,204,264 A | 5/1980 | Lipman | |
| 4,876,634 A | 10/1989 | Paice | |
| 5,124,904 A | 6/1992 | Paice | |
| 5,148,357 A | 9/1992 | Paice | |
| 5,455,759 A | 10/1995 | Paice | |
| 5,619,407 A | 4/1997 | Hammond | |
| 6,005,362 A * | 12/1999 | Enjeti et al. | 318/479 |
| 6,198,647 B1 | 3/2001 | Zhou et al. | |
| 6,208,537 B1 | 3/2001 | Skibinski et al. | |
| 6,249,443 B1 | 6/2001 | Zhou et al. | |
| 6,335,872 B1 * | 1/2002 | Zhou et al. | 363/154 |
| 6,385,064 B1 | 5/2002 | Zhou et al. | |
| 6,507,503 B2 * | 1/2003 | Norrga | 363/17 |
| 6,525,951 B1 * | 2/2003 | Paice | 363/154 |
| 6,549,434 B2 | 4/2003 | Zhou et al. | |
| 6,654,798 B1 | 11/2003 | Skibinski et al. | |
| 6,657,322 B2 | 12/2003 | Skibinski et al. | |
| 6,998,950 B2 | 2/2006 | Skibinski | |
| 7,005,829 B2 * | 2/2006 | Schnetzka | 318/801 |
| 7,113,065 B2 | 9/2006 | Skibinski | |
| 7,277,302 B2 * | 10/2007 | Gazel et al. | 363/5 |
| 7,535,738 B2 * | 5/2009 | Wei et al. | 363/71 |
| 7,555,912 B2 * | 7/2009 | Schnetzka et al. | 62/228.4 |
| 7,612,514 B2 | 11/2009 | Anghel et al. | |
| 2008/0049468 A1 | 2/2008 | Wei et al. | |

* cited by examiner

*Primary Examiner* — Walter Benson
*Assistant Examiner* — David Luo
(74) *Attorney, Agent, or Firm* — Fay Sharpe LLP; Alexander R. Kuszewski; John M. Miller (57) ABSTRACT

Power conversion systems and methods are provided for driving a plurality of motor loads, in which an autotransformer receives AC input currents and provides a plurality of multiphase outputs at a non-zero phase angle relative to one another, and the individual multiphase outputs are provided to corresponding motor drives with rectifiers to convert the multiphase outputs to DC electrical power, and inverters to convert the DC power to AC to drive corresponding motor loads.

25 Claims, 8 Drawing Sheets

POWER CONVERSION SYSTEM AND METHOD

FIELD OF THE INVENTION

The present invention relates generally to electric power converters and more particularly to methods and systems for driving multiple electric motors.

INCORPORATION BY REFERENCE

The following U.S. patents are hereby incorporated by reference in their entireties: U.S. Pat. No. 6,198,647 to Zhou et al., entitled "Twelve-Phase Transformer Configuration", issued Mar. 6, 2001; U.S. Pat. No. 6,335,872 to Zhou et al., entitled "Nine-Phase Transformer", issued Jan. 1, 2002; and U.S. Pat. No. 6,385,064 to Zhou et al., entitled "Harmonic Blocking Reactor for Nine-Phase Converter System", issued May 7, 2002.

BACKGROUND

Power conversion systems are used to convert input power from one form and/or level to another for driving electric motors or other loads. Power converters may include multiple stages for different types of conversion applications, such as AC/DC/AC drives for electric motors, in which input AC power is rectified to provide a DC bus and a second stage selectively switches the DC bus power to create single or multi-phase AC output power of variable voltage and/or frequency to drive an AC motor load. In many industrial applications, multiple motor drives derive power from a single power source, where the initial rectification of the input AC power to DC causes harmonic distortion on the AC supply, often measured in terms of total harmonic distortion (THD, typically stated as a percentage) with respect to the supply voltage and/or current. IEEE Std 519-1992 sets forth recommended limits to the harmonic distortion levels in such systems. Conventionally, DC link chokes, AC line reactors, passive harmonic filters, active harmonic filters, and active converters, have been used for reducing THD in motor drives, and harmonic distortion reduction is typically done on an individual drive basis. These components, however, occupy space and add cost to the drives and often require customization or individualized adaptation or adjustment for specific motor drives. Thus, there is a need for improved power conversion systems and techniques by which the adverse effects of harmonic distortion can be addressed without the additional cost and space and customization required by conventional THD reduction approaches.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. The present disclosure presents power conversion systems and methods for driving a plurality of loads, in which a transformer receives AC input currents and provides a plurality of phase-shifted multiphase outputs. The multiphase outputs are provided to corresponding power converters with rectifiers to convert the multiphase outputs to DC electrical power. The DC power can be used for driving any sort of load, such as inverters to generate AC power to drive motor loads, etc. The inventors have appreciated that the rectification at the individual converters causes less harmonic distortion by virtue of the phase shifting of the multiphase outputs of the transformer, where the summed current seen in the AC supply powering the transformer will have reduced current harmonics compared to conventional systems, regardless of imbalances in the loading of the multiple drives, and without requiring link chokes, line reactors, passive or active harmonic filters, or the customization of particular drives to attain the desired THD performance required by IEEE Std 519-1992.

In accordance with one or more aspects of the present disclosure, a power conversion system is provided, which includes a transformer with an input ad a plurality of multiphase outputs, as well as a plurality of power converts coupled to a corresponding one of the multiphase transformer outputs. The transformer may provide isolation or may be a non-isolating autotransformer. In one embodiment, an optional isolation transformer, such as a three-phase delta-wye ($\Delta$-Y) transformer receives supply power at a primary and provides a secondary to supply the input currents to an autotransformer. The trans former has an input that receives multiphase AC electrical currents, either directly from an AC source or from the optional isolation transformer, as well as and a plurality of multiphase outputs. Each individual transformer output is comprised of a set of at least three output terminals and provides multiphase AC output currents. The AC output currents of each multiphase output are at a non-zero phase angle relative to all other multiphase outputs of the transformer. The system further comprises a plurality of power converters that individually include a multiphase rectifier coupled with a corresponding one of the multiphase outputs of the transformer to convert the corresponding AC output currents to DC electrical power.

In accordance with further aspects of the disclosure, the transformer has a three-phase input and the transformer outputs are three-phase outputs having three output terminals. Other aspects of the disclosure provide that each individual transformer output includes a set of M output terminals and the AC output currents at the output terminals are at a 360/M degree phase relationship to one another. The transformer in accordance with another aspect of the disclosure has an integer number N multiphase outputs, N being greater than 1, and the multiphase outputs are offset by a phase angle of 120/N degrees. In accordance still further aspects of the disclosure, the individual power converters further include an inverter operatively coupled to receive DC power from the rectifier and to provide AC output power to an AC load. The individual power converters in another aspect of the disclosure may be motor drives having an inverter operatively coupled to receive DC power from the rectifier and to provide AC output power to an AC motor load. The power converter rectifiers, moreover, may be active switching rectifiers or passive rectifiers, such as three-phase passive rectifiers including six diodes forming a three-phase rectifier bridge in accordance with further aspects of the disclosure.

In accordance with another aspect of the disclosure, a method is provided for driving multiple AC motors. The method includes transforming multiphase AC electrical currents to create two or more sets of multiphase AC output currents, with each set being at a non-zero phase angle relative to all other sets. The method also includes rectifying each individual set of multiphase AC output currents to create a corresponding DC bus, and inverting each individual DC bus to provide AC output power to a corresponding one of a plurality of AC motor loads. The rectification of each individual set of multiphase AC output currents may include providing each individual set of multiphase AC output currents to a corresponding passive rectifier to create a corresponding DC bus according to a further aspect of the disclosure. In accordance with another aspect, the method further includes isolating the multiphase AC electrical currents from an AC input power source. Transforming the multiphase AC electrical currents in another aspect of the disclosure includes creating two or more sets of three-phase output currents. Further aspects of the disclosed methods involve transforming the multiphase currents to create a plurality of N sets of three-phase AC output currents with the N sets being offset by a phase angle of 120/N degrees. Transforming the multiphase AC electrical currents may include creating two or more sets of multiphase AC output currents with each individual set of multiphase AC output currents including an integer number M AC output currents at a 360/M degree phase relationship to one another, where M is an integer greater than 2.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the invention will be set forth in the following detailed description when considered in conjunction with the drawings, in which.

DETAILED DESCRIPTION OF THE INVENTION

Referring now to the figures, several embodiments or implementations of the present invention are hereinafter described in conjunction with the drawings, wherein like reference numerals are used to refer to like elements throughout, and wherein the various features are not necessarily drawn to scale. The various embodiments shown and described below include motor drive-type power converters that include passive diode-bridge type rectifiers, although any form or type of power converter may be used for driving any form of load and that includes active or passive rectifier receiving multiphase AC output currents from a phase-shifting transformer. The illustrated embodiments, moreover, are shown using non-isolating autotransformers, although this is not a strict limitation of the disclosure, and isolating-type phase-shifting transformers may be employed or autotransformers may be used in combination with separate isolating transformers.

Figure 1:
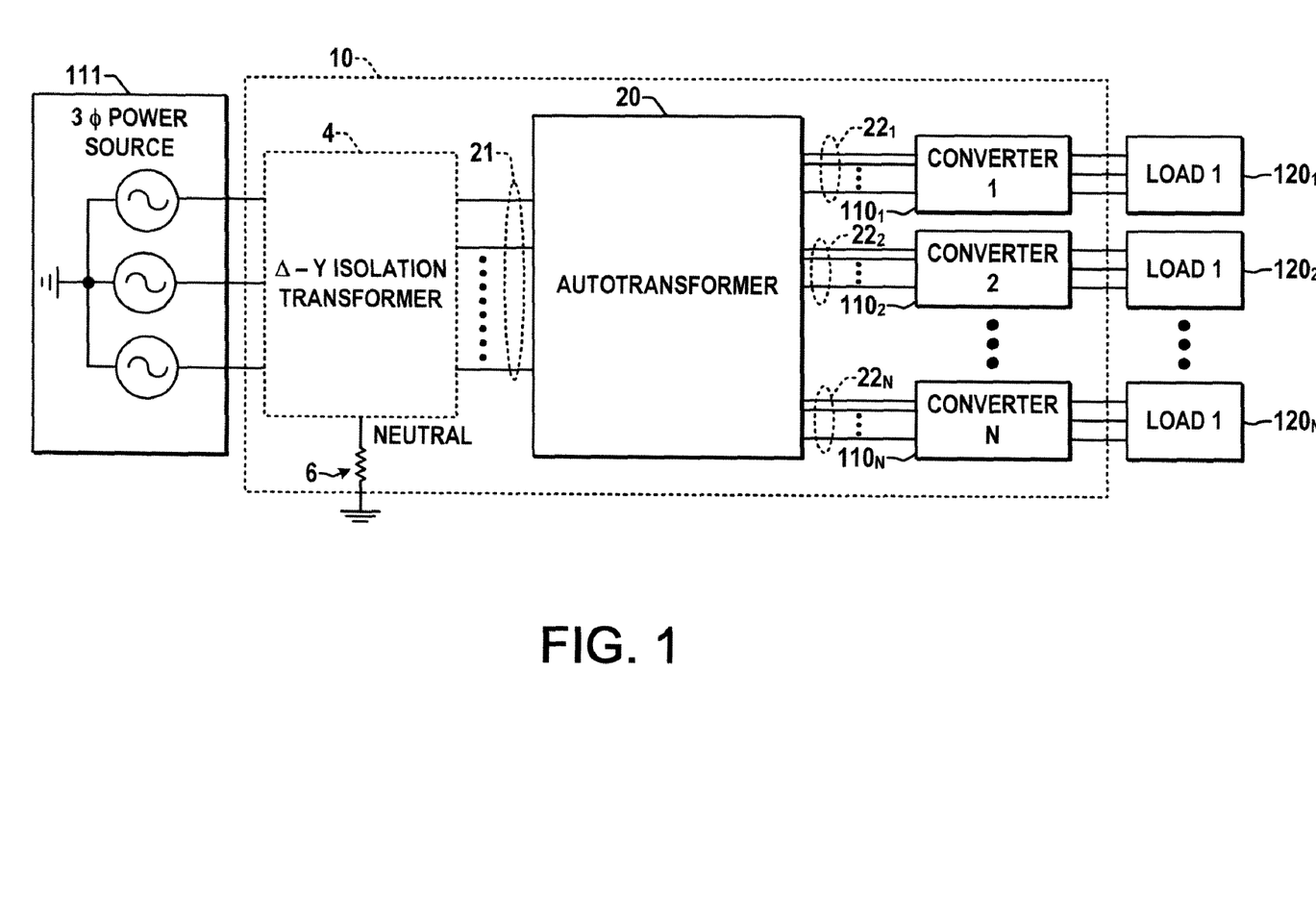
FIG. 1 is a schematic diagram illustrating an exemplary power conversion system with an autotransformer providing phase-shifted multiphase AC outputs to a plurality of motor drive power converters in accordance with one or more aspects of the present disclosure, and having an optional Δ-Y isolation transformer with a fault current-limiting neutral that isolates the multiphase AC electrical currents at the autotransformer inputs from an AC input power source.

Referring initially to FIG. 1, an exemplary power conversion system 10 is illustrated, which includes a transformer 20 receiving multiphase AC power from an AC power source 111 via an optional Δ-Y isolation transformer 4 having a Δ primary (not shown) and a "Y" secondary (not shown) that provides a neutral grounded via a fault current limiting resistor 6. In other implementations, the neutral of the optional isolation transformer 4 (if used) can be directly grounded. The optional isolation transformer 4 in general will preferably provide an integer number "K" output phases as inputs 21 to the transformer 20, where K is greater than 1. The transformer 20 is comprised of an input 21 which receives multiphase AC electrical currents, three-phase in the illustrated examples, although other inputs are contemplated as falling within the scope of the present disclosure to receive multiphase inputs having more than three phases. Examples of suitable autotransformers 20 are described in U.S. Pat. Nos. 6,198,647; 6,335,872; and 6,385,064 to Zhou et al., the entireties of which are hereby incorporated by reference. As depicted in FIG. 1, moreover, the autotransformer 20 has an integer number "N" multiphase outputs 22, where N is an integer greater than 1. Each of the outputs 22 includes a set of "M" output terminals, where M is an integer greater than 2. The individual outputs 22 provide multiphase AC output currents at the output terminals, with the AC output currents of each multiphase output 22 being at a non-zero phase angle relative to all other multiphase outputs. In the exemplary embodiments, moreover, the multiphase outputs are offset by a phase angle of 120/N degrees, although not a strict requirement of the broader aspects of the disclosure. In addition, within the sets of outputs 22, the multiphase AC output currents at the output terminals are at a 360/M degree phase relationship to one another, although not a strict requirement of the disclosure.

The system 10 further includes a plurality of power converters 110, each of which includes a multiphase rectifier 110a (e.g., FIGS. 2, 3, and 8 below) operatively coupled with one of the multiphase outputs 22 to convert the corresponding AC output currents to DC electrical power used to drive a corresponding load 120. Moreover, the novel architecture prevents circulation of fault current from one converter 110 into other converters 110, and the optional resistor 6 operates to limit the fault current. The converters 110 may include many different forms of rectifier circuits. For example, in one embodiment, one or more of the power converters 110 includes an SCR rectifier circuit for variable DC voltage loads 120, DC motor loads, or current source AC inverter loads (e.g., as illustrated and described further below in connection with FIG. 8). In other embodiments, the converters 110 can include diode rectifier circuits, such as for driving pulse width modulated (PWM) AC inverter loads 120, PWM DC loads 120, and/or the converters 10 may include IGBT rectifier circuits such as for driving regenerative PWM AC inverter loads 120 and/or regenerative PWM DC loads. Moreover, one or more of the converters 110 may be a voltage source converters, such as the exemplary voltage source AC motor drive 110 illustrated and described below in association with FIG. 9.

Figure 2:
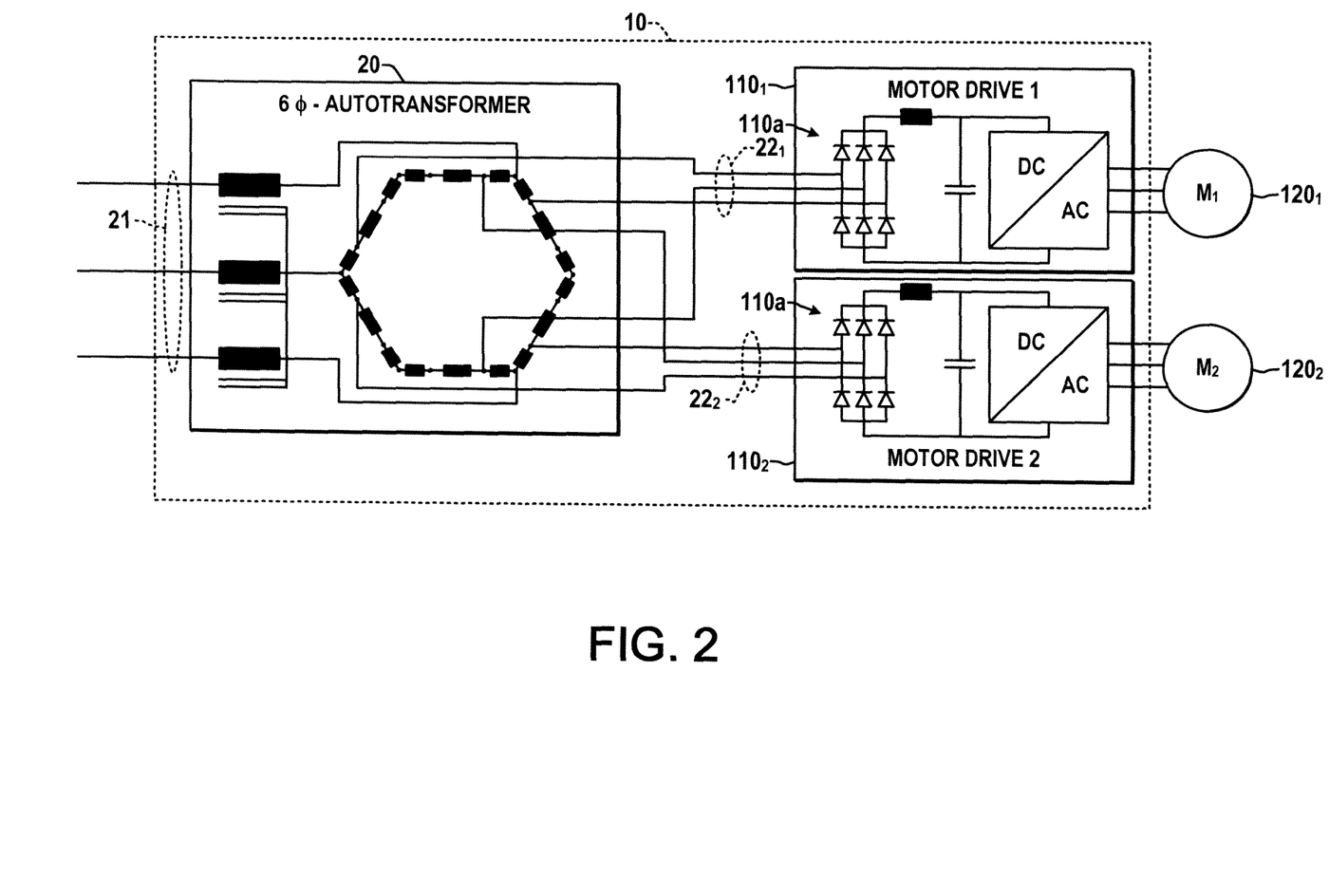
FIG. 2 is a schematic diagram illustrating a particular embodiment of an exemplary power conversion system including a three-phase in, six-phase out autotransformer providing three-phase outputs to two motor drive power converters at a 60 degree phase relationship to one another in accordance with various aspects of the present disclosure.
Figure 7:
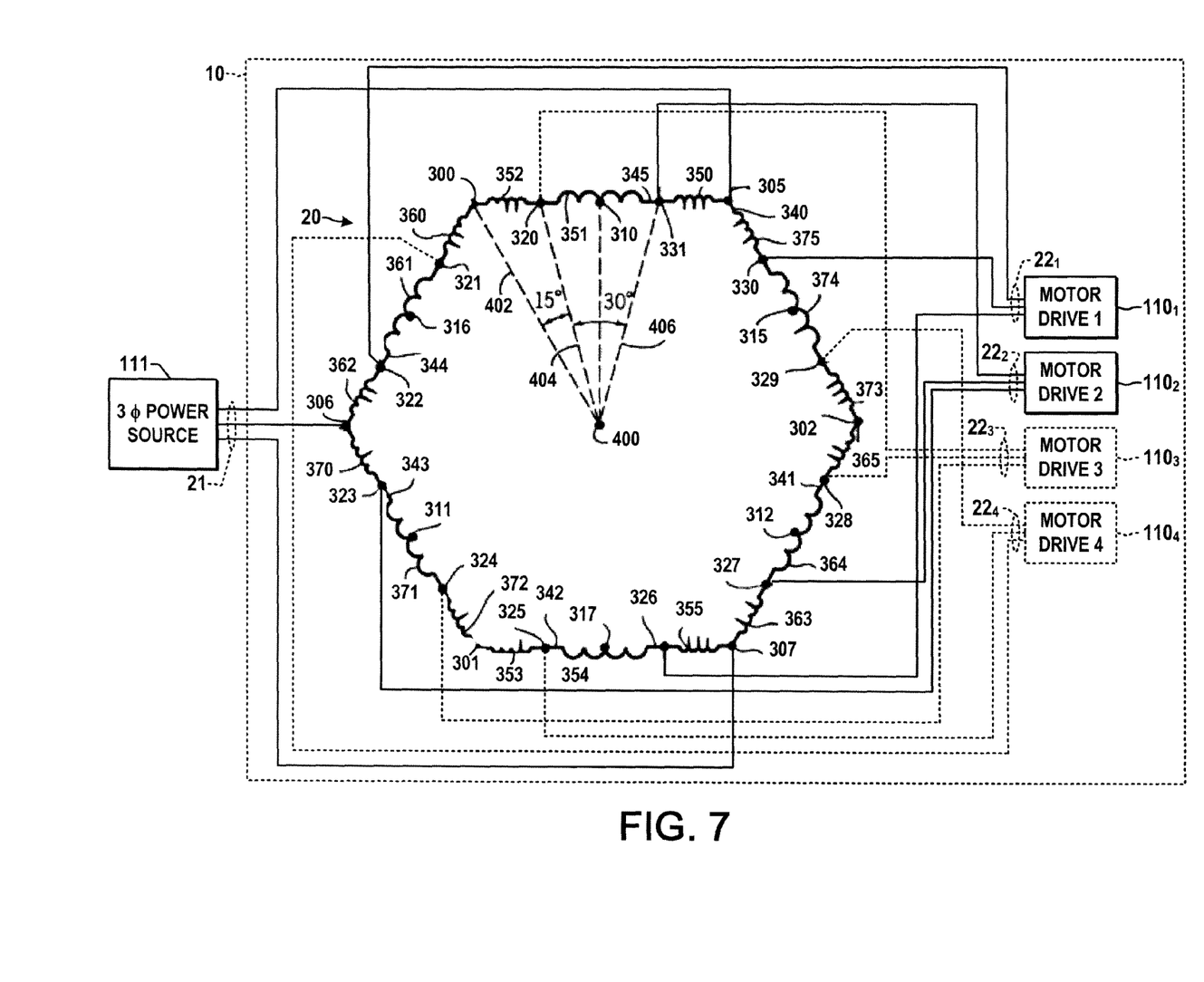
FIG. 7 is a schematic diagram illustrating an exemplary 6 or 12 phase autotransformer that may be employed in the conversion systems of FIGS. 2 or 4 in accordance with the disclosure.
Figure 8:
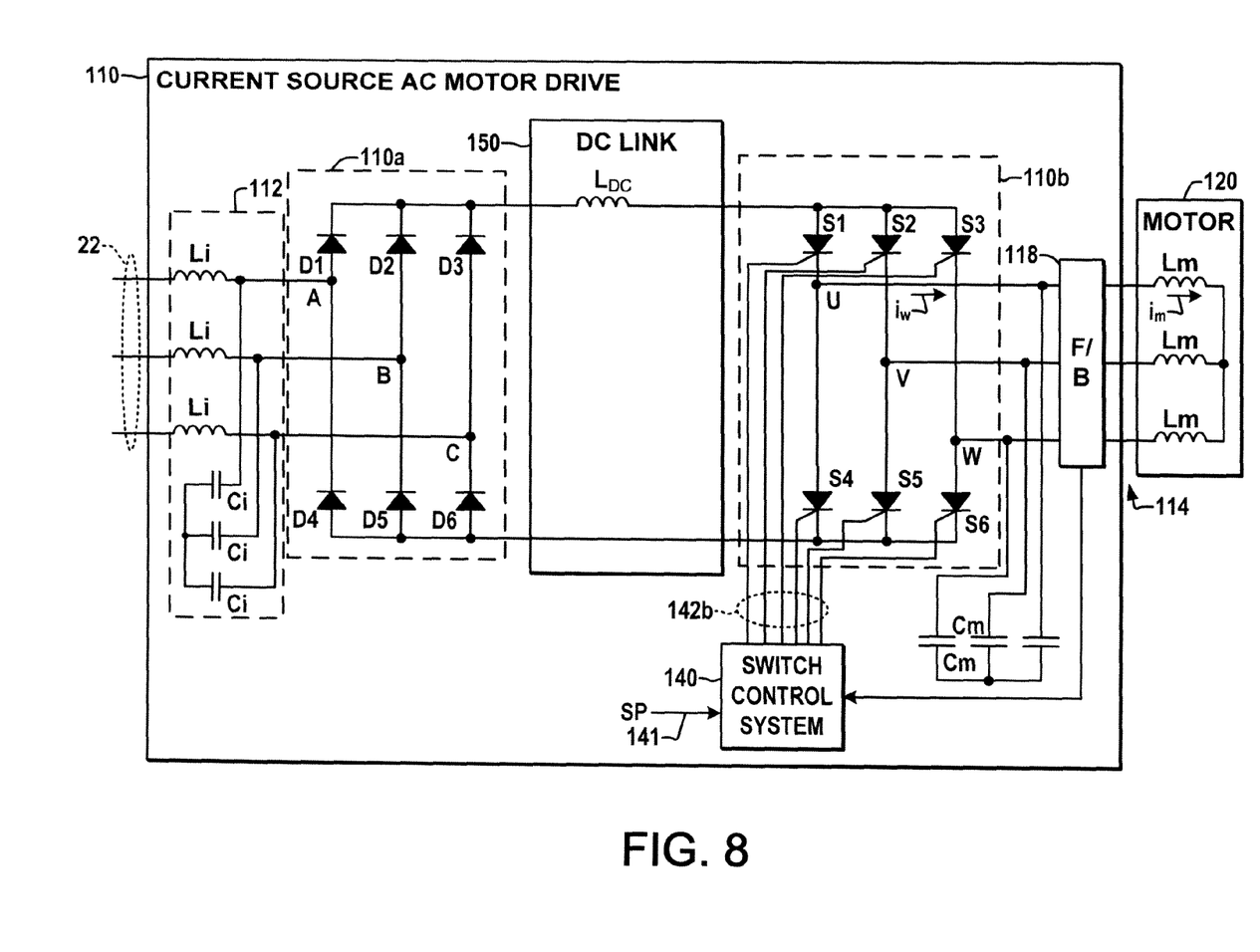
FIG. 8 is a schematic diagram illustrating an exemplary three-phase current source converter with a passive six-diode bridge rectifier and an inverter that may be used in the motor drive systems of FIGS. 1-7 in accordance with one or more aspects of the present disclosure.

Referring to FIGS. 2 and 7, FIG. 2 depicts an exemplary embodiment of the system 10 including an autotransformer 20 having a three-phase input 21 and a six-phase output to provide a set of two three-phase outputs 22$_1$ and 22$_2$ to first and second motor drive power converters 110$_1$ and 110$_2$, respectively. FIG. 7 illustrates further details of one suitable six-phase autotransformer 20 that may be employed in the conversion system 10 of FIG. 2, the details of which are described in Zhou et al., U.S. Pat. No. 6,198,647. The illustrated transformer input 21 has a three-phase input operative to receive three-phase AC electrical currents from the source 111, and the transformer outputs 22 are three-phase outputs having a set of three output terminals each. In the system 10 of FIG. 2, the input rectifier of the first motor drive 110$_1$ is connected to taps 322, 330, and 326 of the autotransformer 20 (FIG. 7), and the second motor drive 110$_2$ is connected to taps 331, 327, and 323 of the autotransformer 20 to provide a 60 degree phase relationship between the first and second sets of three-phase transformer outputs 22$_1$, and 22$_1$, respectively. FIG. 8 below shows further details of one exemplary three-phase motor drive power converter 110 that may be employed in the system 10 of FIG. 2. As shown in FIGS. 2 and 8, the exemplary motor drive converters 110 each include a passive six-diode rectifier bridge 110a that converts the three-phase output 22 into a DC bus, as well as a DC link 150 having a link choke $L_{DC}$ and a DC link capacitor $C_{DC}$, along with an inverter 110b that receives DC power from the rectifier 110a via the link 150 and provides AC output power to an AC motor load 120.

The inventors have appreciated that diode bridge rectifiers (and also switching rectifiers) can create unwanted current harmonics which create voltage distortions in the supply power at the source 111 absent countermeasures. In conventional systems where multiple motor drives and their respective diode bridge rectifiers were connected directly to the AC source 111, DC link chokes, AC line reactors, passive harmonic filters, active harmonic filters, and/or active converters had to be used in order to combat the THD associated with the rectifier harmonics. In accordance with various aspects of the present disclosure, on the other hand, a phase-shifting autotransformer 20 is employed to supply phase-shifted power to multiple converters 120. This novel configuration operates to reduce current harmonics in the summed current seen in the three-phase source 111 without the need for additional THD reducing components in the drives 110. Moreover, this architecture advantageously mitigates THD even where the loading among the multiple power converters 110 is unequal and/or where voltage imbalances are seen in the supply voltages. The THD reduction aspects of the disclosure thus find particular utility in association with AC motor drives or other types of converters that have passive rectifier input stages, as described in the following exemplary embodiments.

Operational simulations have been performed with the system architecture shown in FIG. 2 with respect to load imbalance and voltage imbalance, and the results are shown in the following Tables 1 and 2, respectively:

TABLE 1

| 100 hp % Load 1 | 100 hp % Load 2 | Ithd | Vthd | Ipri |
|---|---|---|---|---|
| 100 | 100 | 7.5 | 1.7 | 201 |
| 100 | 75 | 8.4 | 1.4 | 175 |
| 100 | 50 | 11.2 | 1.3 | 150 |
| 100 | 25 | 16.4 | 1.3 | 126 |
| 100 | 1 | 28.4 | 1.5 | 104 |
| 75 | 75 | 7.9 | 1.3 | 149 |
| 75 | 50 | 9.5 | 1.1 | 124 |
| 75 | 25 | 14.8 | 1.1 | 100 |
| 50 | 50 | 8.0 | 1.2 | 99 |
| 50 | 25 | 12.1 | 1.0 | 75 |
| 25 | 25 | 9.1 | 0.8 | 50 |
| 1 | 100 | 28.2 | 1.7 | 103 |

TABLE 2

| % Z | % Vunb | % V5 | V5 theta | Ithd | Vthd | Ipri | PF | I1 | I2 | % I unb | Vdc 1 | Vdc 2 |
|---|---|---|---|---|---|---|---|---|---|---|---|---|
| 5 | 0 | 0 | 0 | 7.5 | 1.7 | 201 | 0.973 | 118 | 118 | 0.0 | 559 | 559 |
| 5 | 1 | 0 | 0 | 7.7 | 1.7 | 207 | 0.967 | 120 | 122 | 1.8 | 559 | 559 |
| 5 | 0 | 3 | 0 | 9.1 | 3.1 | 201 | 0.972 | 118 | 118 | 0.6 | 559 | 559 |
| 5 | 0 | 3 | 180 | 8.8 | 3.1 | 200 | 0.972 | 118 | 118 | 0.6 | 559 | 559 |
| 20 | 0 | 0 | 0 | 5.8 | 5.5 | 206 | 0.970 | 121 | 121 | 0.2 | 544 | 544 |
| 20 | 1 | 0 | 0 | 5.8 | 5.4 | 210 | 0.967 | 123 | 124 | 0.9 | 544 | 544 |
| 20 | 0 | 3 | 0 | 6.9 | 5.8 | 206 | 0.969 | 121 | 121 | 0.7 | 544 | 544 |
| 20 | 0 | 3 | 180 | 6.7 | 5.9 | 205 | 0.970 | 121 | 120 | 0.9 | 544 | 544 |

For the system 10 shown in FIG. 2 with a six-phase autotransformer, the simulated THD values are compared with conventional current harmonic distortion levels of about 32%. As seen in Table 1 above, the current harmonic distortion (ITHD) is well below 32% for most cases of load imbalance apart from 28.4% ITUD for the extreme case where one load is 100% and the other load is only 1%, and it is noted that this amount of load imbalance is unlikely to be seen in typical installations. Also, the voltage harmonic distortion (VTHD) remains below 2% for all simulated cases of load imbalance in Table 1. As seen in Table 2, moreover, the simulate ITHD and VTHD levels are below 10% ad 6%, respectively, for all simulated cases of voltage imbalance at the source 111. Thus, the employment of phase shifting between the multiple motor drives 110 advantageously facilitates operation within the voltage and current distortion requirements of IEEE Std 519-1992 to avoid or mitigate the adverse effects of harmonic distortion without the additional cost, space, and,/or customization required by conventional THD reduction techniques.

Figure 3:
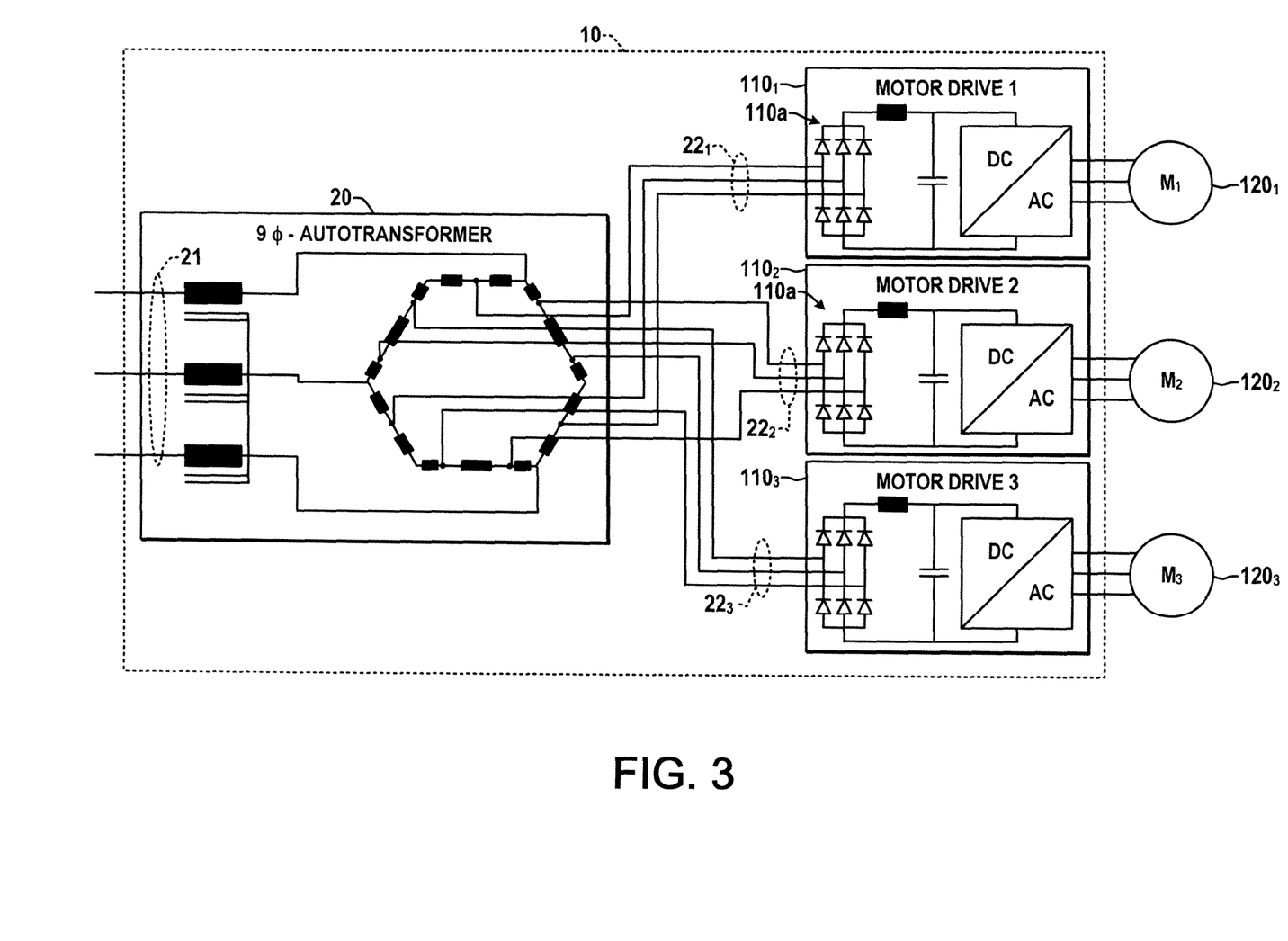
FIG. 3 is a schematic diagram illustrating another embodiment of a power conversion system according to one or more aspects of the disclosure, in which a nine-phase autotransformer provides three-phase outputs to three motor drive power converters at a 40 degree phase relationship to one another.
Figure 6:
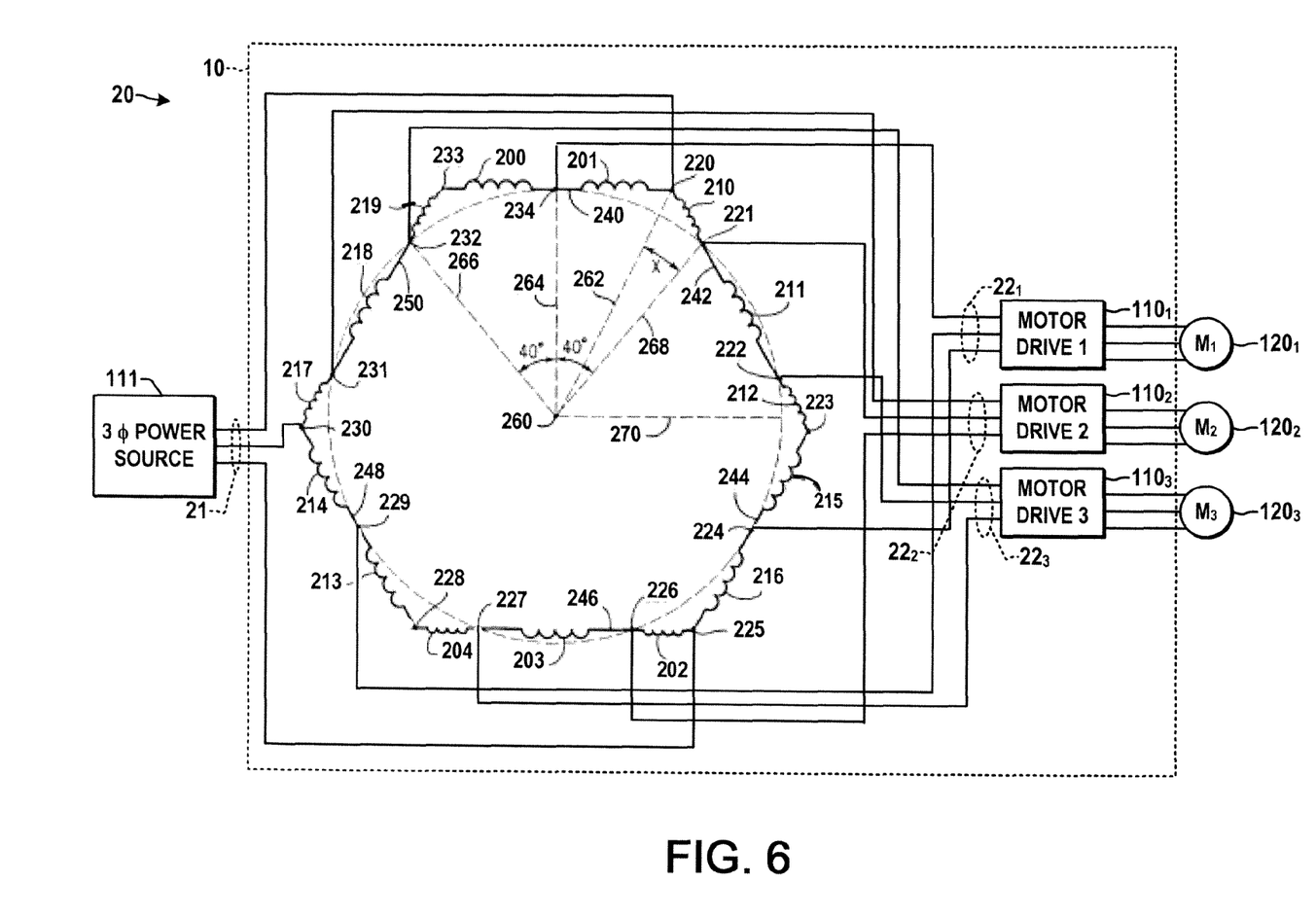
FIG. 6 is a schematic diagram illustrating further details of an exemplary nine-phase autotransformer providing three-phase outputs to three motor drive power converters in the conversion system of FIG. 3 according to the disclosure.

Referring now to FIGS. 3 and 6, FIG. 3 illustrates another exemplary embodiment of a power conversion system 10 with a nine-phase autotransformer 20 supplying three motor drive power converters according the present disclosure, and FIG. 6 illustrates details of an exemplary nine-phase autotransformer 20 that may be employed in the system 10 of FIG. 3, where the nine-phase autotransformer 20 provides three-phase outputs the converters at a 40 degree phase relationship to one another. In this embodiment, the nine-phase autotransformer 20 provides three sets of three-phase outputs $22_1$-$22_3$ to motor drive power converters $101_1$-$110_3$, respectively. Further details of this exemplary transformer design 20 are described below in connection with FIG. 6 and are set forth in Zhou et al., U.S. Pat. No. 6,335,872. In this case, the transformer 20 has a three-phase input 21 that receives AC electrical currents from the source 111, and the transformer outputs 22 are three-phase outputs having three output terminals each. In this embodiment, the first motor drive $110_1$ has a passive rectifier $110a$ (FIG. 3) connected to taps 224, 229, and 234 of the autotransformer 20 (FIG. 6), the second motor drive $110_2$ is connected to taps 221, 226, and 231, and the third motor drive $110_3$ is coupled with transformer taps 222, 227, and 232 whereby the autotransformer 20 provides a 60 degree phase relationship between the three sets of three-phase transformer outputs $22_1$-$22_3$.

This exemplary system 10 of FIGS. 3 and 6 was simulated with respect to load imbalance and voltage imbalance. The simulation results are shown in the following Tables 3 and 4, with the harmonic distortion performance again exceeding the conventional case of three motor drive power converters connected directly to the source of three-phase AC power.

TABLE 3

| 67 hp % Load 1 | 67 hp % Load 2 | 67 hp % Load 3 | Ithd | Vthd | Ipri |
|---|---|---|---|---|---|
| 100 | 100 | 100 | 3.0 | 1.4 | 200 |
| 100 | 100 | 25 | 9.1 | 1.3 | 152 |
| 100 | 100 | 1 | 12.8 | 1.4 | 133 |

TABLE 3-continued

| 67 hp % Load 1 | 67 hp % Load 2 | 67 hp % Load 3 | Ithd | Vthd | Ipri |
|---|---|---|---|---|---|
| 100 | 50 | 75 | 6.3 | 1.1 | 151 |
| 100 | 25 | 25 | 13.8 | 1.1 | 104 |
| 100 | 1 | 100 | 13.7 | 1.4 | 136 |
| 100 | 1 | 1 | 30.6 | 1.2 | 70 |
| 90 | 80 | 70 | 3.7 | 1.3 | 160 |
| 75 | 100 | 50 | 5.3 | 1.2 | 150 |
| 75 | 75 | 75 | 3.5 | 1.0 | 150 |
| 75 | 50 | 25 | 8.0 | 0.9 | 101 |
| 50 | 75 | 100 | 6.4 | 1.3 | 151 |
| 50 | 50 | 50 | 4.8 | 0.8 | 101 |
| 25 | 100 | 25 | 12.0 | 0.9 | 101 |
| 25 | 25 | 25 | 4.3 | 0.3 | 53 |
| 1 | 100 | 100 | 13.6 | 1.2 | 136 |
| 1 | 100 | 1 | 30.7 | 1.2 | 70 |
| 1 | 1 | 100 | 30.6 | 1.2 | 73 |

TABLE 4

| % Z | % Vunb | % V5 | V5 theta | Ithd | Vthd | Ipri | PF | I1 | I2 | I3 | % I unb | Vdc 1 | Vdc 2 | Vdc 3 |
|---|---|---|---|---|---|---|---|---|---|---|---|---|---|---|
| 5 | 0 | 0 | 0 | 3.0 | 1.4 | 200 | 0.974 | 80 | 80 | 80 | 0.4 | 559 | 559 | 559 |
| 5 | 1 | 0 | 0 | 5.2 | 1.5 | 207 | 0.966 | 81 | 83 | 82 | 3.3 | 559 | 559 | 559 |
| 5 | 0 | 3 | 0 | 5.9 | 3.1 | 200 | 0.973 | 80 | 81 | 80 | 0.4 | 562 | 559 | 557 |
| 5 | 0 | 3 | 180 | 5.3 | 3.1 | 200 | 0.974 | 80 | 80 | 81 | 1.1 | 556 | 560 | 562 |
| 20 | 0 | 0 | 0 | 2.5 | 4.1 | 205 | 0.973 | 82 | 82 | 82 | 0.7 | 545 | 546 | 546 |
| 20 | 1 | 0 | 0 | 3.5 | 4.1 | 210 | 0.969 | 83 | 84 | 83 | 1.3 | 545 | 546 | 546 |
| 20 | 0 | 3 | 0 | 4.1 | 4.6 | 205 | 0.973 | 82 | 82 | 82 | 0.6 | 548 | 546 | 543 |
| 20 | 0 | 3 | 180 | 4.2 | 4.8 | 205 | 0.973 | 82 | 81 | 82 | 1.3 | 542 | 547 | 548 |

As seen in the above Table 3, ITHD in this case is below 32% and VTHD is less than 2% for all the simulated load imbalance conditions, and the ITHD is less than 15% for most common cases of load imbalance. Moreover, the system 10 performs well with regard to ITHD and VTHD for the source voltage imbalance conditions simulated in Table 4.

Figure 4:
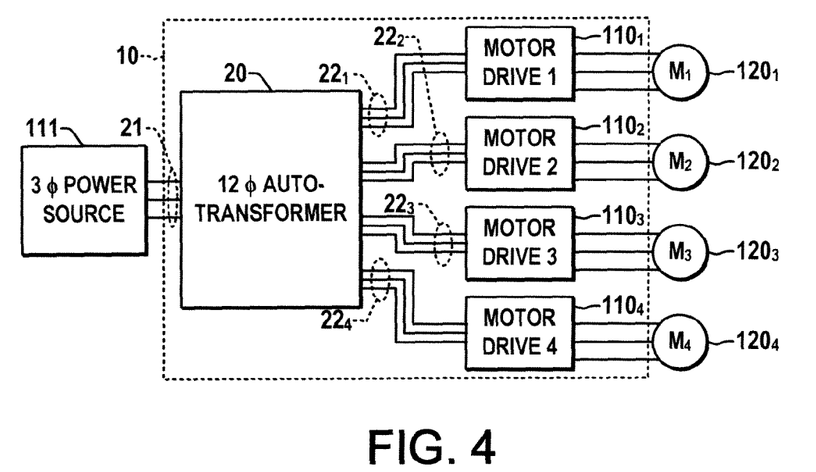
FIG. 4 is a schematic diagram illustrating still another embodiment of a power conversion system, in which a twelve-phase autotransformer provides three-phase outputs to four motor drive power converters at a 30 degree phase relationship to one another in accordance with one or more aspects of the disclosure.
Figure 5:
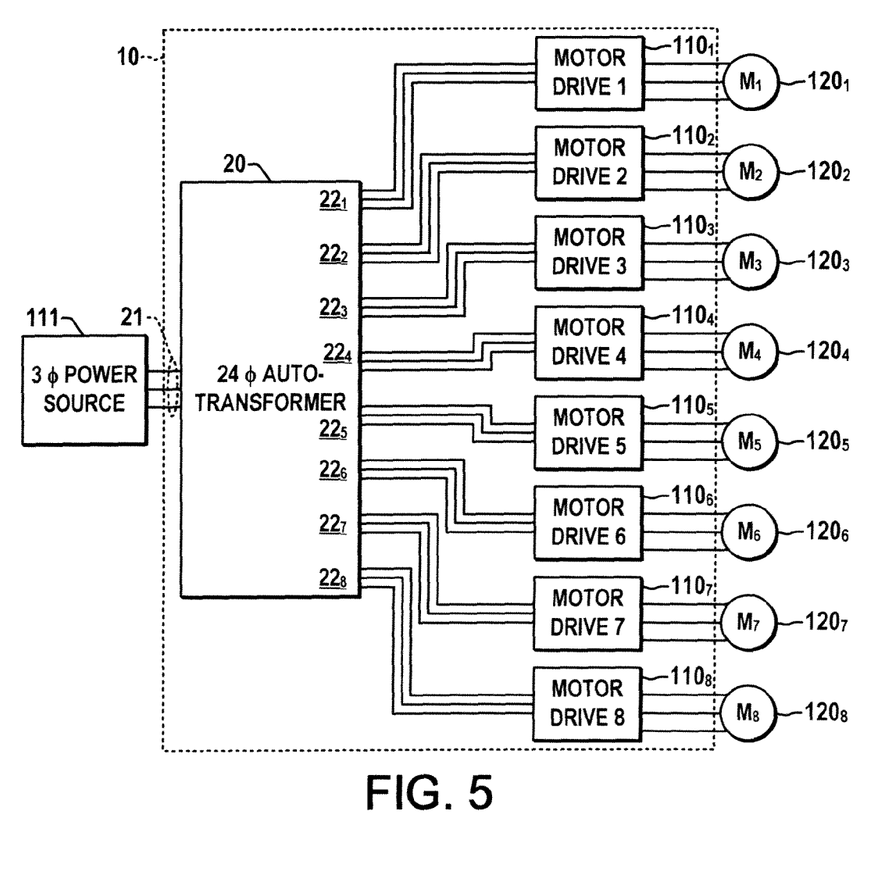
FIG. 5 is a schematic diagram illustrating still another embodiment of a power conversion system, in which a twenty four-phase autotransformer provides a set of eight three-phase outputs to eight motor drive power converters at a 15 degree phase relationship to one another according to various aspects of the present disclosure.

Referring now to FIGS. 4, 5 and 7, any number of embodiments are possible within the scope of the present disclosure, in which a power conversion system 10 includes a transformer 20 receiving multiphase AC input power and providing a set of N multiphase outputs 22 that are phase-shifted relative to one another to a corresponding set of N power converters 110, such as motor drives or other converters having input rectifiers. The system 10 in FIG. 4 employs a twelve-phase autotransformer 20 that provides four sets of three-phase outputs $22_1$-$22_4$ to four motor drive power converters $110_1$-$110_4$, respectively, at a 30 degree phase relationship to one another. In this case, the autotransformer 20 of FIG. 7 may again be employed with the first and second drive converters $110_1$ and $110_2$ being connected as described above in connection with FIG. 2, ad with the third and fourth drives $110_3$ and $110_4$ (shown in dashed lines in FIG. 7) being connected to output terminal tap sets 320, 324, 328, and 321, 325, 329, respectively. FIG. 5 illustrates another exemplary embodiment where the power conversion system 10 has a 24-phase autotransformer 20 providing eight three-phase output sets to eight motor drive power converters $110_1$-$110_8$ at a 15 degree phase relationship.

FIG. 6 illustrates further details of the exemplary nine-phase autotransformer 20, an example of which is illustrated and described in U.S. Pat. No. 6,335,872. The autotransformer 20 provides three sets of three-phase outputs $22_1$-$22_3$ to the three motor drive converters $110_1$-$110_3$, as initially described above in connection with FIG. 3. The illustrated autotransformer 20 is coupled to a 3-phase AC source 111

(e.g., directly or via an intervening isolation transformer, not shown) at input taps 220, 225, and 230, and includes nine output lines identified in FIG. 6 by tap nodes 231, 232, 234, 221, 222, 224, 226, 227, and 229 used to establish the three-phase output sets $22_1$-$22_3$. The autotransformer 20 includes alternate input taps 223, 228, and 233 which are not used in the exemplary configuration. The autotransformer 20 in this case is constructed on a core with three equal legs (not shown) for magnetic flux, and the core preferably has no other magnetic flux paths so that the flux flowing down through one pole must return upwards through another pole. The poles pass through various coils, with a first coil including first through fifth windings 200 through 204, a second coil including first through fifth windings 210 through 214, and a third coil including windings 215 through 219 as shown in FIG. 6. Each winding 200-204, 210-219 may be constructed using a single winding specific wire. In the alternative, several series windings may be constructed using a single wire or all of the windings may be constructed using a single wire. For example, windings 200 and 201 may be constructed using a single wire having a center tap for linking as an output node and/or an input node. Preferably all of the windings have a similar construction, the distinction being primarily in the number of turns that are included in each winding. Each winding 200 through 204 will experience the same induced volts per turn. The same will be true for windings 210 through 214 and for windings 215 through 219. Therefore, each winding 200-204, 210-214, and 215-219 on the same respective pole will be in phase with one another. Each winding 200-204, 210-214, and 215-219 has the same polarity provided that the direction of each winding 200-204, 210-214, and 215-219 is consistent. For example, assuming the right end of each winding 200-204 shown in FIG. 6 is the start end, the end of winding 201 joining node 220 and the end of winding 202 joining node 225 are both start ends and so on. The windings of the autotransformer 20 in FIG. 6 are linked in a series fashion to form the hexagonal shape schematically shown in the figure, including first through sixth legs 240, 242, 244, 246, 248, and 250, respectively.

The exemplary autotransformer 20 in FIG. 6 includes first coil $1^{st}$ and $2^{nd}$ windings 200 and 201 arranged in series on either side of tap 234 on one core leg 240, as well as second coil $1^{st}$, $2^{nd}$, and $3^{rd}$ windings 210, 211 and 212 arranged in series on a second leg 242. Third coil $1^{st}$ and $2^n$ windings 215 and 216 are arranged in series on a third leg 244, and first coil $3^{rd}$-$5^{th}$ windings 202, 203, and 204, respectively, are arranged in series on leg 246. In addition, second coil $4^{th}$ and $5^{th}$ windings 213 and 214 are arranged in series on fifth leg 148 and the third coil $3^{rd}$-$5^{th}$ windings 217 through 219, respectively, are arranged in series on the sixth leg 250. The input and output tap nodes 220-234 are formed at the joining points between the adjacent windings. The transformer 20 in FIG. 6 is schematically represented as a voltage plane wherein distance between any of nodes 220-234 and a neutral or origin 260 represents the voltage magnitude at the corresponding node. Thus, for example, an exemplary vector 262 in FIG. 6 is formed between the origin 260 and the node 220 represents voltage magnitude at the node 220. In this regard, a slightly shorter vector 264 is formed between the origin 260 and the node 234. As schematically illustrated, therefore, comparing the exemplary vectors 262 and 264, the voltage magnitude at the node 220 is greater than the voltage magnitude at the node 234, and similar voltage magnitude vectors (not shown) can be drawn for each node in FIG. 6.

The exemplary nine-phase autotransformer 20 in FIGS. 5 and 6 provides a nine-phase output at the output nodes 221, 222, 224, 226, 227, 229, 231, 232 and 234, where the angle between two vectors (e.g., 262 and 264) represents a phase shift angle between two node voltages. The windings are arranged and sized such that the phase shift between each two adjacent output node voltages is essentially 40 degrees, although not a strict requirement of the disclosure. For example, the phase angle between voltages at nodes 234 and 221 is 40 degrees. Similarly, the phase shifts between voltages at nodes 221 and 222, 222 and 224, 224 and 226, 226 and 227, 227 and 229, 229 and 231, 231 and 232, and 232 and 234 are each 40 degrees. Similarly, the windings are sized and arranged such that the voltage magnitude vectors at each output node are identical. For example, each of vectors 264, 266 and 268 are identical, although not a strict requirement of the disclosure. The autotransformer 20, moreover, can be used as either a step-down, step-down, or unity gain transformer, and the voltage magnitude vector 270 corresponding to input node 223 is longer than the output node voltage magnitude vectors (e.g., 268, 264, 266, etc.). Similarly, although not illustrated, the voltage magnitude vectors corresponding to each of the input nodes 228 and 233 are identical with respect to the vector 270 and are each longer than the output voltage magnitude vectors.

FIG. 7 provides further details of an exemplary 6 or 12 phase autotransformer 20 that may be employed in the above described power conversion systems of FIGS. 2 or 4 in accordance with the disclosure, an example of which is shown in U.S. Pat. No. 6,198,647. The transformer 20 is coupled in FIG. 7 to the 3-phase AC source 111 (e.g., directly or through an isolation transformer 4 as in FIG. 1), and provides six or twelve output lines grouped in sets 22 of three-phases to two or four drives 110 and the rectifiers thereof. As with the nine-phase transformer 20 of FIG. 6, the autotransformer 20 in FIG. 7 includes three equal paths or legs for magnetic flux and a core (not shown) having three poles (not shown) with no other magnetic flux paths, such that the flux flowing down through one pole returns upwards through another pole. The poles pass through first, second, and third coils, each of which includes a plurality of windings. In this regard, a first coil includes $1^{st}$-$6^{th}$ windings 375, 374, 373, 372, 371, and 370, respectively, a second coil includes $1^{st}$-$6^{th}$ windings 365-360, respectively, and a third coil includes $1^{st}$-$6^{th}$ windings 355-350, respectively. The windings 350-355, 360-365, and 370-375 may be constructed using a single winding specific wire, or several series windings may be constructed using a single wire, or all of the windings may be constructed using a single wire.

The windings, moreover, are series-coupled to form a hexagon shape schematically shown in FIG. 7, including $1^{st}$-6th legs, 340-345. The first coil $1^{st}$-$3^{rd}$ windings 375, 374, and 373 are series-coupled on leg 340, the second coil 18 $1^{st}$-$3^{rd}$ windings 365, 364, and 363 are coupled in series on second leg 341, the third coil $1^{st}$-$3^{rd}$ windings 355, 354, and 353 are coupled in series on the third leg 342, the first coil $4^{th}$-$6^{th}$ windings 372, 371, and 370 are series-coupled on the fourth leg 343, the second coil 18 $4^{th}$-$6^{th}$ windings 362, 361, and 360 are connected in series on the fifth leg 344, and the third coil 20 $4^{th}$-$6^{th}$ legs 352, 351, and 350 are series-coupled on the sixth leg 345. The legs are arranged in series, first through sixth, as illustrated. The autotransformer thus provides input and output tap nodes 300-302, 305-307 at the joining points between adjacent windings. In the schematic diagram of FIG. 7, moreover, the illustrated distance between any of nodes 300-302, 305-307, or 320-331 and the neutral (origin) 400 represents the voltage magnitude at the corresponding node. For example, a vector 402 between the origin 400 and the node 300 represents voltage magnitude at node 300, and a shorter vector 404 between the origin 400 and the node 320 indicates that the voltage at node 320 is lower than that of node 300. In this example, moreover, the voltage magnitudes at nodes 404 and 406 are equal, and similar voltage magnitude relationships can be ascertained in this manner based on the schematic representation in FIG. 7. In addition, the angle between the illustrated vectors 404 and 406 and each two such vectors represents the phase shift angle between the two node voltages corresponding to the vectors, where the windings in this exemplary transformer 20 are arranged and sized such that the phase shift between each two adjacent output node voltages is essentially 30 degrees.

Referring also to FIG. 8, a three-phase current source converter motor drive 110 is shown, which may be used as one or more of the individual power converters 110 in the power conversion systems 10 of FIGS. 1-7 above in accordance with one or more aspects of the present disclosure. This exemplary drive 110 is a current source converter-type having a passive six-diode bridge rectifier 110a receiving three-phase input voltage from the autotransformer 20, a DC link 150 for the DC bus established by the rectifier 110a with a link choke or inductance $L_{DC}$, and an inverter 110b that converts the DC bus power to three-phase AC output voltages and currents $i_m$ to drive a load motor 120 represented in the drawing as three motor phase windings Lm. The drive 110 includes a three-phase input 112 that receives the input power from the transformer output 22 and converts the input AC power to a DC bus and then inverts the DC to drive a three-phase AC motor load 120 coupled to a converter output 114. The drive 110 provides variable frequency, variable amplitude multiphase AC output power at output terminals 114 for driving the motor 120, where other embodiments may provide a single phase AC output or may be of any number of phases or may provide a DC output to a load 120. Also, other converters 110 may be used that employ an active (e.g., switching-type) rectifier 110a that receives the AC output 22 from the autotransformer 20. The drive 110 may include one or more input filtering components, such as inductors Li in each input phase and/or input filter capacitors Ci coupled between the input lines A, B, C, and an input neutral node. Furthermore, the drive 110 may include one or more output filtering components, such as the illustrated Y-connected motor capacitors Cm and one or more isolation components (e.g., transformers, not shown) may be included in the inverter/output stage, wherein all such alternate embodiments are contemplated as falling within the scope of the present disclosure and the appended claims.

The illustrated passive rectifier 110a is comprised of bridge-configured diodes D1-D6 coupled between the input 112 and the DC circuit 150 and operates to create an intermediate DC bus current in the intermediate circuit 150. The inverter 110b includes a plurality of switching devices S1-S6 coupled with the DC circuit 150 and the output 114. The switching devices S1-S6 are operated according to a plurality of switching control signals 142b from a switch control system 140 to selectively convert the DC power from the DC circuit 150 to provide the AC output power at the output 114 to the motor load 120. The inverter switching devices S1-S6 may be any suitable controllable electrical switch types (e.g., IGCTs, GTOs, thyristors, IGBTs, etc.) that are controlled according to any suitable type or form of switching scheme or schemes, such as phase control, pulse width modulation, etc., in open or closed-loop fashion. The DC link circuit 150 includes a DC choke or inductor $L_{DC}$ linking the switches of the rectifier 110a and the inverter 110b and provides forward and reverse current paths between the rectifier and inverter stages 110a and 110b, although other forms and types of intermediate circuit storage elements may be employed within the scope of the present disclosure.

The exemplary converter 110 includes a feedback system 118 operatively coupled with one or more of the input 112, the DC circuit 150, and the output 114 to provide one or more feedback values indicative of electrical conditions at the input 112, the DC circuit 150, and/or the output 114. The exemplary inverter 110b operates under control of the switch control system 140 that receives one or more setpoint desired values 141 and one or more feedback signals or values from a feedback system 118 by which one or more closed loop power conversion goals are achieved in normal operation. In the illustrated embodiments, for example, the switch control system 140 provides one or more inputs 141 for receiving torque, speed, and or angle setpoint values, and for receiving corresponding or related feedback signals or values from the feedback system 118, measured input values (e.g., line voltages, currents, etc.), and other information, data, etc., which may be in any suitable form such as an electrical signal, digital data, etc., and which may be received from any suitable source, such as an external network, switches, a user interface associated with the system 100, or other suitable source(s). The switch control system 140 may be any suitable hardware, software, firmware, logic, or combinations thereof that is/are adapted, configured, programmed, or otherwise operative to implement the functions required to control the output power, voltages, and/or currents provided to the load 120.

Figure 9:
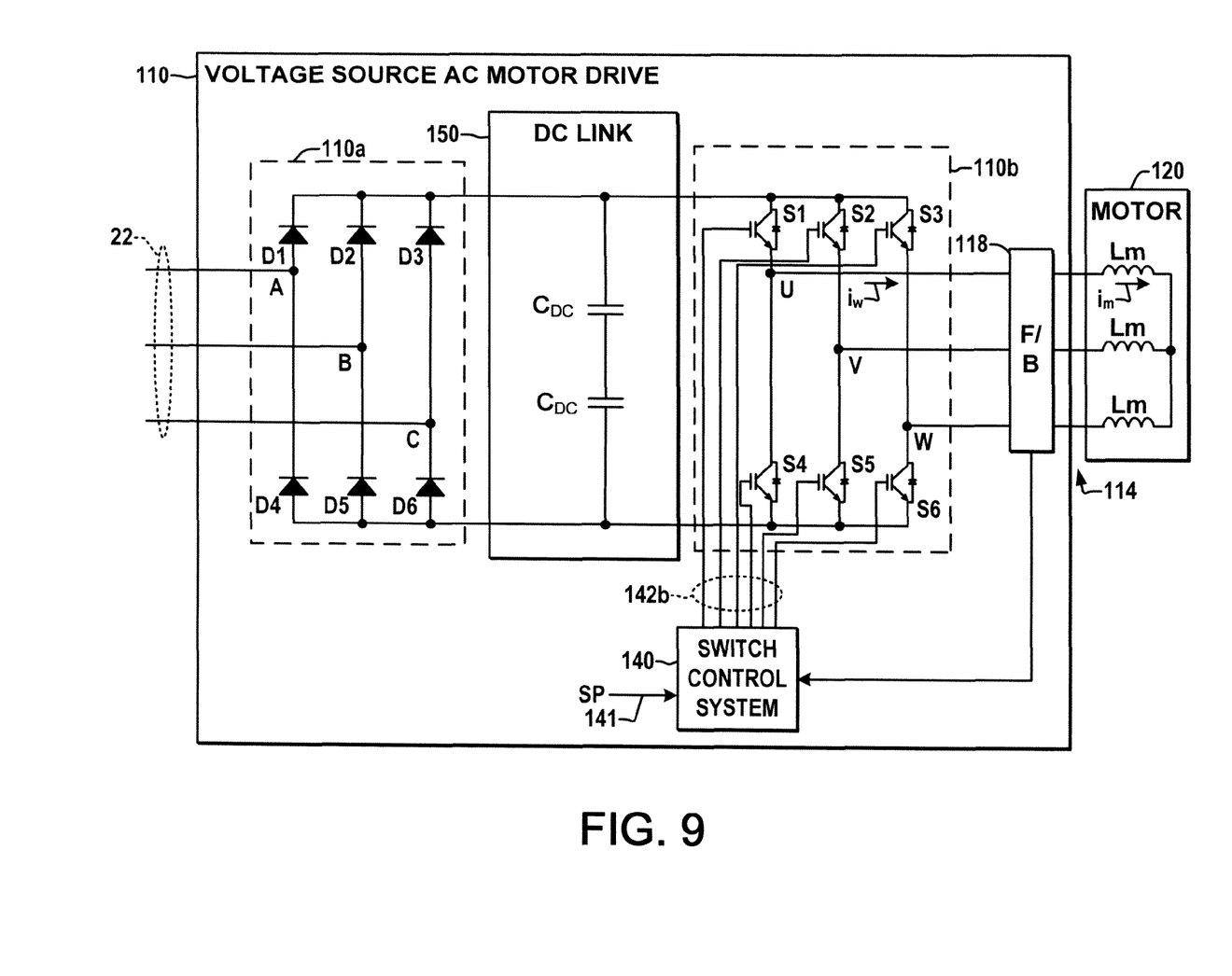
FIG. 9 is a schematic diagram illustrating an exemplary three-phase voltage source converter with a passive six-diode bridge rectifier and an inverter that may be used in the motor drive systems of FIGS. 1-7 in accordance the disclosure.

FIG. 9 illustrates another exemplary implementation of a motor drive converter 110 that may be employed in connection with the systems of FIGS. 1-7 above. In this case, the converter 110 is a voltage source converter-type AC motor drive that receives input power from the transformer 20 and includes a diode rectifier circuit 110a as described above in connection with FIG. 8. The rectifier creates DC bus voltage in a DC link circuit 150 having one or more link capacitances $C_{DC}$ coupled across positive and negative bus terminals that link the output of the rectifier 110a to the input of a switching inverter circuit 110b. The inverter includes switching devices S1-S6 that are operated according to inverter switching control signals 142b from the switch control system 140 in order to convert DC voltages from the link circuit 150 into output terminal voltages at nodes U, V, and W to drive an AC motor load 120 at three phase output terminals 114.

In accordance with further aspects of the disclosure, a method is provided for driving multiple AC motors. The method includes transforming multiphase AC electrical currents to create two or more sets of multiphase AC output currents, each set of multiphase AC output currents being at a non-zero phase angle relative to all other sets, as well as rectifying each individual set of multiphase AC output currents to create a corresponding DC bus, and inverting each individual DC bus to provide AC output power to a corresponding one of a plurality of AC motor loads. In certain implementations, the method may also include isolating the multiphase AC electrical currents from an AC input power source, such as by using the exemplary isolation transformer 4 shown in FIG. 1 above. In various implementations of the method, transforming the multiphase AC electrical currents may involve creating two or more sets of three-phase output currents, and may separately or in combination include creating an integer number N sets of three-phase AC output currents, N being greater than 1, where the N sets of three-phase AC output currents are offset by a phase angle of 120/N degrees. The transforming of the multiphase AC currents may also include creating two or more sets of multiphase AC output currents with each individual set of multiphase AC output currents including an integer number M output currents at a 360/M degree phase relationship to one another, where M is an integer greater than 2. The rectification, moreover, may be performed using a passive rectifier or an active rectifier for each of the corresponding multiphase outputs.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A power conversion system, comprising:
    a multiphase autotransformer, comprising:
        an input operative to receive multiphase AC electrical currents from an isolation transformer or a multiphase AC power source, and
        an integer number N multiphase outputs, wherein N is greater than 1, each individual output including a set of an integer number M output terminals, wherein M is greater than 2, each individual output being operative to provide multiphase AC output currents at the output terminals, with the AC output currents of each multiphase output being at a non-zero phase angle relative to all other multiphase outputs; and a plurality of power converters, each individual power converter including: a DC output, and a multiphase rectifier operatively coupled with one of the multiphase outputs to convert the corresponding AC output currents to provide DC electrical power at the corresponding DC output to power a DC link having a choke, an inductance or a capacitance coupled between the multiphase rectifier and the DC output, the DC outputs of the plurality of power converters being separate from one another.

2. The power conversion system of claim 1, wherein the autotransformer input is a three-phase input operative to receive three-phase AC electrical currents, and wherein the autotransformer outputs are three-phase outputs having three output terminals.

3. The power conversion system of claim 1, wherein each transformer output is a three-phase output having three output terminals, and wherein the multiphase outputs are offset by a phase angle of 120/N degrees.

4. The power conversion system of claim 1, wherein the autotransformer is a non-isolating autotransformer.

5. The power conversion system of claim 1, wherein each individual output of the transformer is operative to provide multiphase AC output currents at the output terminals at a 360/M degree phase relationship to one another.

6. The power conversion system of claim 1, wherein the individual power converters further include an inverter operatively coupled to receive DC power from the DC output and to provide AC output power to an AC load.

7. The power conversion system of claim 6, wherein the individual power converters are motor drives comprising an inverter operatively coupled to receive DC power from the DC output and to provide AC output power to an AC motor load.

8. The power conversion system of claim 1, wherein the multiphase rectifiers are passive rectifiers.

9. The power conversion system of claim 8, wherein the autotransformer outputs are three-phase outputs having three output terminals, and wherein the multiphase rectifiers are passive rectifiers including six diodes forming a three-phase rectifier bridge.

10. The power conversion system of claim 9, wherein the individual power converters are motor drives comprising an inverter operatively coupled to receive DC power from the DC output and to provide AC output power to an AC motor load.

11. The power conversion system of claim 10, wherein the autotransformer is a non-isolating autotransformer, the system further including an isolation transformer receiving AC input power from a power source and providing the multiphase AC electrical currents to the input of the autotransformer.

12. The power conversion system of claim 8, further including an isolation transformer receiving AC input power from a power source and providing the multiphase AC electrical currents to the input of the autotransformer.

13. The power conversion system of claim 1, further including an isolation transformer receiving AC input power from a power source and providing the multiphase AC electrical currents to the input of the autotransformer.

14. The power conversion system of claim 13, wherein the isolation transformer provides an integer number K output phases, K being an integer greater than 1.

15. The power conversion system of claim 1, wherein at least one of the plurality of power converters includes an SCR rectifier circuit.

16. The power conversion system of claim 1, wherein at least one of the plurality of power converters includes a diode rectifier circuit.

17. The power conversion system of claim 1, wherein at least one of the plurality of power converters includes an IGBT rectifier circuit.

18. A method for driving multiple AC motors, the method comprising:
    using a multiphase autotransformer having an integer number N multiphase outputs (N>1) with each multiphase output including a set of an integer number M output terminals (M>2), transforming multiphase AC electrical currents from an isolation transformer or a multiphase AC power source to create N sets of multiphase AC output currents, each set of multiphase AC output currents being at a non-zero phase angle relative to all other sets;
    rectifying each individual set of multiphase AC output currents to create a corresponding DC bus to power a DC link for the DC bus having a choke, an inductance or a capacitance coupled between a multiphase rectifier and the DC output; and
    inverting each individual DC bus to provide AC output power to a corresponding one of a plurality of AC motor loads.

19. The method of claim 18, further comprising isolating the multiphase AC electrical currents from an AC input power source.

20. The method of claim 18, wherein transforming the multiphase AC electrical currents comprises creating two or more sets of three-phase output currents.

21. The method of claim 20, wherein transforming the multiphase AC electrical currents comprises creating N sets of three-phase AC output currents, and wherein the N sets of three-phase AC output currents are offset by a phase angle of 120/N degrees.

22. The method of claim 18, wherein the N sets of multiphase AC output currents are offset by a phase angle of 120/N degrees.

23. The method of claim 18, wherein each individual set of multiphase AC output currents includes M AC output currents at a 360/M degree phase relationship to one another.

24. The method of claim 18, wherein rectifying each individual set of multiphase AC output currents to create a corresponding DC bus comprises providing each individual set of multiphase AC output currents to a corresponding passive rectifier to create a corresponding DC bus.

25. A power conversion system, comprising:
a multiphase autotransformer comprising:
an input operative to receive multiphase AC electrical currents from an isolation transformer or a multiphase AC power source, and
an integer number N multiphase outputs, wherein And is greater than 1, each individual output including a set of an integer number M output terminals, wherein M is greater than 2, each individual output being operative to provide multiphase AC output currents at the output terminals, with the AC output currents of each multiphase output being at a non-zero phase angle relative to all other multiphase outputs; and a plurality of power converters, each individual power converter including:
a DC output, and
a multiphase rectifier operatively coupled with one of the multiphase outputs to convert the corresponding AC output currents to provide DC electrical power at the corresponding DC output to power a DC link having a choke, an inductance or a capacitance coupled between the multiphase rectifier and the DC output, the DC outputs of the plurality of power converters being separate from one another; wherein at least one of the power converters includes an inverter operatively coupled to receive DC power from the corresponding DC output and to provide AC output power to an AC motor load.

* * * * *